United States Patent
House et al.

(10) Patent No.: US 6,732,172 B1
(45) Date of Patent: May 4, 2004

(54) METHOD AND SYSTEM FOR PROVIDING CROSS-PLATFORM ACCESS TO AN INTERNET USER IN A HETEROGENEOUS NETWORK ENVIRONMENT

(75) Inventors: Daniel Edward House, Raleigh, NC (US); Shaw-Ben Shepherd Shi, Austin, TX (US); Richard Lee Daugherty, Cary, NC (US); John Ryan McGarvey, Apex, NC (US); Chandra Paul Immanuel, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,291

(22) Filed: Jan. 4, 2000

(51) Int. Cl.[7] .................. G06F 15/173; G06F 15/16; G06F 11/30; G06F 12/14; H04L 9/00
(52) U.S. Cl. .................. 709/225; 713/200; 713/201; 709/227; 709/228; 709/249
(58) Field of Search .................. 707/10; 709/225, 709/231; 713/201, 202

(56) References Cited

U.S. PATENT DOCUMENTS

| | | | | |
|---|---|---|---|---|
| 5,442,791 A | * | 8/1995 | Wrabetz et al. | 709/330 |
| 5,768,504 A | * | 6/1998 | Kells et al. | 713/201 |
| 5,819,047 A | * | 10/1998 | Bauer et al. | 709/229 |
| 5,864,950 A | * | 2/1999 | Harata et al. | 29/893.1 |
| 5,944,824 A | * | 8/1999 | He | 713/201 |
| 6,061,740 A | * | 5/2000 | Ferguson et al. | 709/246 |
| 6,073,242 A | * | 6/2000 | Hardy et al. | 713/201 |
| 6,088,451 A | * | 7/2000 | He et al. | 713/201 |
| 6,131,120 A | * | 10/2000 | Reid | 709/225 |
| 6,243,816 B1 | * | 6/2001 | Fang et al. | 713/202 |
| 6,275,944 B1 | * | 8/2001 | Kao et al. | 713/202 |
| 6,311,275 B1 | * | 10/2001 | Jin et al. | 713/201 |
| 6,332,163 B1 | * | 12/2001 | Bowman-Amuah | 709/231 |
| 6,366,954 B1 | * | 4/2002 | Traversat et al. | 709/220 |
| 6,434,568 B1 | * | 8/2002 | Bowman-Amuah | 707/10 |
| 6,438,594 B1 | * | 8/2002 | Bowman-Amuah | 709/225 |

OTHER PUBLICATIONS

Marvin A. Sirbu et al. Distributed Authentication in Kerberos Using Public Key Cryptography. 1997. IEEE. p. 134–141.*

* cited by examiner

Primary Examiner—Gregory Morse
Assistant Examiner—Christian LaForgia
(74) Attorney, Agent, or Firm—Sawyer Law Group LLP (57) ABSTRACT

The present invention provides a method and system for providing cross-platform access to Internet users of a heterogeneous grouping of computers. In a system aspect, the system includes a plurality of heterogeneous computer systems, at least one of the plurality of computer systems including an Internet user identity; and an enterprise directory service, the enterprise directory service being shared by the plurality of computer systems, the enterprise directory including at least one enterprise role which is associated with the Internet user identity, the at least one enterprise role capable of being used to access the plurality of computer systems independently of any specific operating system user identification. By allowing enterprise roles to be defined independently of any specific operating system user identification, flexibility is injected into the network configuration and Internet user aggravation is reduced. Enterprise roles may also be provided in the context of enterprise groups, allowing access to systems in the network by Internet users to be more readily controlled.

15 Claims, 5 Drawing Sheets

METHOD AND SYSTEM FOR PROVIDING CROSS-PLATFORM ACCESS TO AN INTERNET USER IN A HETEROGENEOUS NETWORK ENVIRONMENT

FIELD OF THE INVENTION

The present invention relates to multiplatform computer system networks, and more particularly to the grouping of computer systems in the networks.

BACKGROUND OF THE INVENTION

In distributed computer networks, many operating system platforms may be employed on server and client systems within the network. Each different platform utilizes its own administrative rules for user login procedures. Thus, each platform typically has characteristic techniques for assigning user identifiers and passwords to control access to the resources and services of the system. In large, heterogeneous network environments, difficulty exists in providing user access to resources on a platform that is different than the one the user is logged into. Thus, the user is restricted from effectively and efficiently utilizing the resources of the network.

One method and system of providing a common user identify and to integrate the user's experience among different platforms without being intrusive is developed by International Business Machines Corporation™. This method and system is described in co-pending U.S. Patent Application entitled, "Method and System for a Heterogeneous Computer Network System with Unobtrusive Cross-Platform User Access", Ser. No. 09/165,368, filed on Oct. 2, 1998. In an exemplary system aspect, a plurality of computer systems are coupled in a network, each of the computer systems operating according to one of a plurality of operating system platforms. Each of the operating system platforms has an associated security mechanism. The network further includes an enterprise directory included on at least one server system of the computer systems. The Enterprise Directory is configured for security interception to allow an authorized user access among the services of the computer systems without affecting the associated security mechanisms of the operating system platforms.

Through this network, local security procedures and policies apply on each platform, thus allowing users to log-on to a single network operating system according to that system's known log-in procedures. A user object is achieved that, when spanning all systems, provides a distributed user context that is useful in unobtrusively achieving access to separate platforms. However, this network may be inefficient in that each user object has access to all systems in the network. It may be unnecessary or undesirable for a user object to have such broad access.

Difficulty also exists for user access through the Internet to large heterogeneous network environments. For example, XYZ Corporation may build a web site and provide application logic behind the web site on one system on a particular platform. The same corporation may build another web site on another system with a different platform. The web sites may not be linked to one another. The effect of the lack cooperation between XYZ Corporation's web sites is Internet user aggravation and an inability for XYZ Corporation to collect coordinated data on their Internet customers. For example, and Internet user interacts with a web application on one of the systems. This system asks the Internet user for his or her name, address, credit-card information, and many others things. The Internet user also interacts with a web application on another system. Since these systems do not share any user context information, the second system asks the Internet user to enter the same information again. The Internet user is thus aggravated, because XYZ Corporation does not behave as one company, making the user perform extra typing for no obvious benefit.

In addition to aggravating the Internet user, XYZ Corporation also deprives itself of coordinated customer data across its divisions. At a minimum, coordinating customer data is difficult since XYZ Corporation will need to mine data from several sources and to cross check for duplicated customers.

Accordingly, there exists in need for a method and system for providing cross-platform access to an Internet user in a heterogeneous network environment. The present invention addresses such a need.

SUMMARY OF THE INVENTION

The present invention provides a method and system for providing cross-platform access to Internet users of a heterogeneous grouping of computers. In a system aspect, the system includes a plurality of heterogeneous computer systems, at least one of the plurality of computer systems including an Internet user identity; and an enterprise directory service, the enterprise directory service being shared by the plurality of computer systems, the enterprise directory including at least one enterprise role which is associated with the Internet user identity, the at least one enterprise role capable of being used to access the plurality of computer systems independently of any specific operating system user identification. By allowing enterprise roles to be defined independently of any specific operating system user identification, flexibility is injected into the network configuration and Internet user aggravation is reduced. Enterprise roles may also be provided in the context of enterprise groups, allowing access to systems in the network by Internet users to be more readily controlled.

DETAILED DESCRIPTION

The present invention provides a method and system for providing cross-platform access to an Internet user in a heterogeneous network environment. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention provides cross-platform access to Internet users by allowing roles to be defined independently of any specific operating system userid, which may be used for authorization purposes.

To more particularly describe the features of the present invention, please refer to FIGS. 1 through 5 in conjunction with the discussion below.

Figure 1:
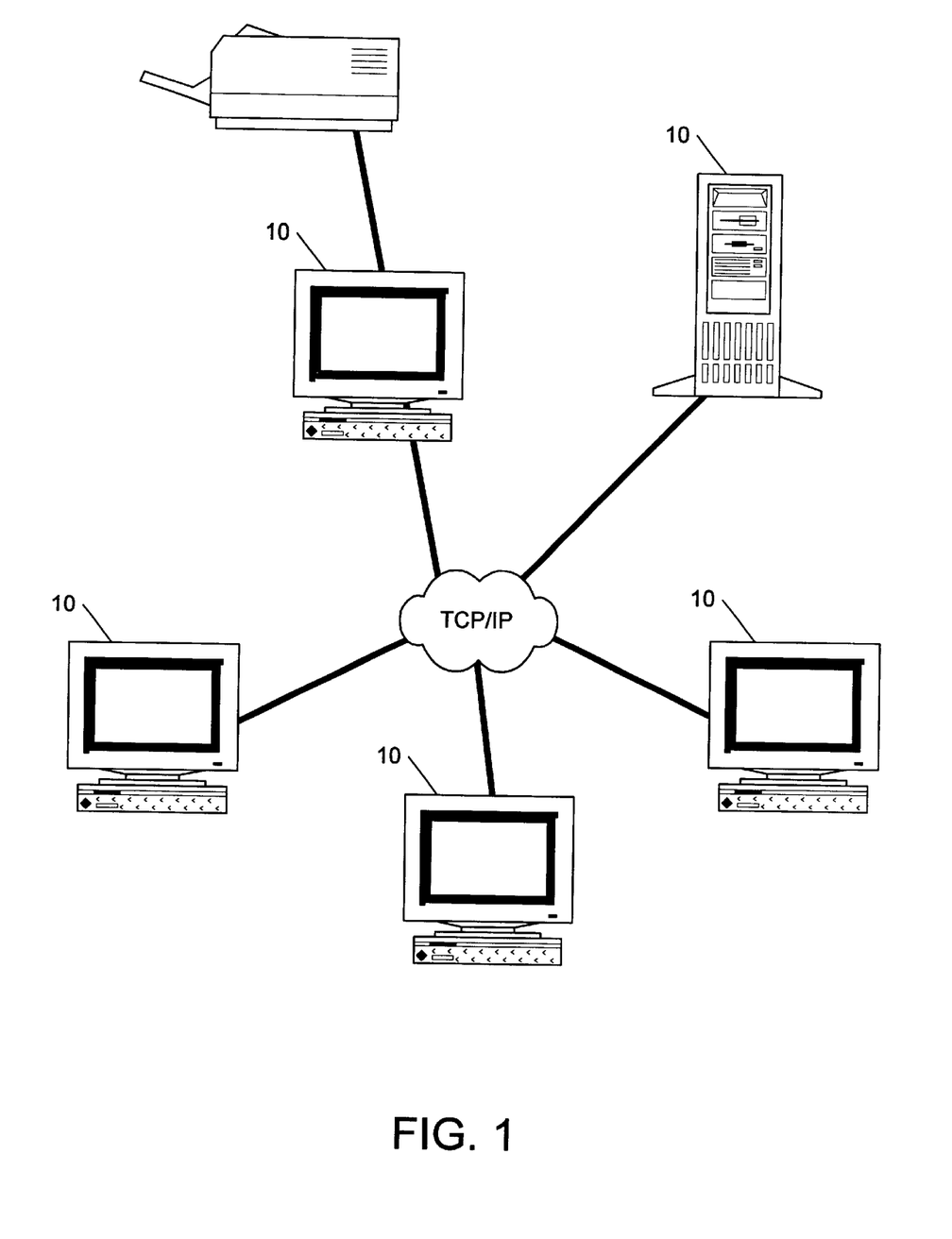
FIG. 1 illustrates a diagram representation of the heterogeneous, distributed computer network arrangement in accordance with the present invention.
Figure 2:
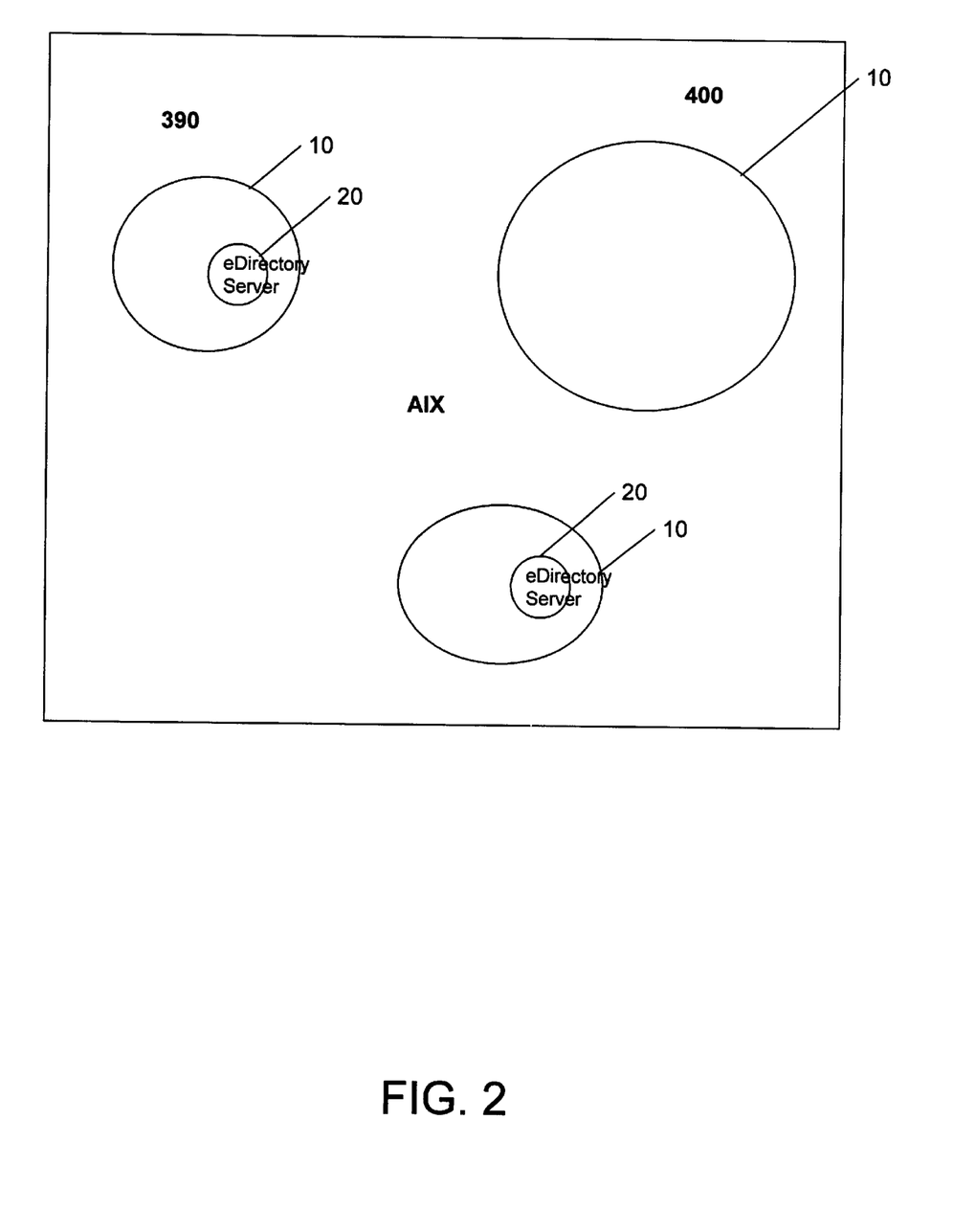
FIG. 2 illustrates a real configuration of the heterogeneous, distributed computer network in accordance with the present invention.

FIG. 1 illustrates a diagram representation of the heterogeneous, distributed computer network arrangement that includes a plurality of computer systems 10, e.g., a plurality of server and client systems, that communicate in accordance with an appropriate communication protocol, e.g., TCP/IP. As illustrated in FIG. 2, the systems 10 operate under different types of operating system platforms, such as computer systems operating under AIX™, OS/390™, OS/2™, OS/400™, VM™, MVS™, or Window N™, as is well understood by those skilled in the art. Of course, the platforms listed herein are meant as illustrated examples of suitable platforms. Other platforms may be utilized as desired for particular design needs, as is well understood by those skilled in the art. On one or more of the systems 10 has an Enterprise Directory Server 20 (eDirectory Server). Once an eDirectory Server is created on one system, that server can make replicas of directory servers on other systems.

Figure 3:
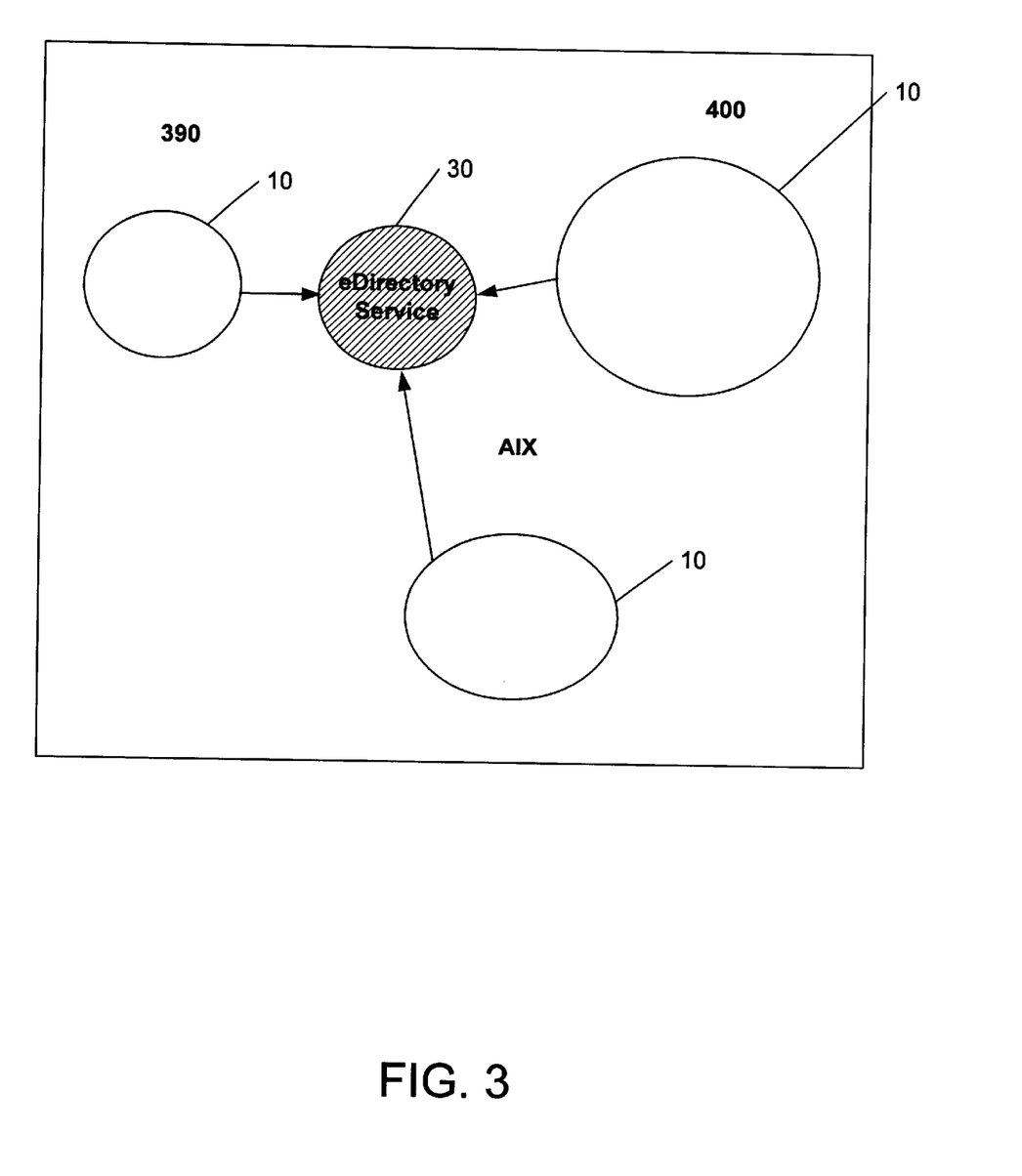
FIG. 3 illustrates a logical configuration of the heterogeneous, distributed computer network in accordance with the present invention.

FIG. 3 illustrates a logical configuration of the heterogeneous, distributed computer network in accordance with the present invention. All of the systems 10 share a common Enterprise Directory Service 30 (eDirectory Service). The eDirectory Service 30 is comprised of the one or more eDirectory Servers 20 but is independent of their specific locations. The eDirectory Service 30 comprises a plurality of user objects, referred to herein as EnterpriseUsers or eUsers, that span all platforms and exist in a directory referred to herein as eDirectory (enterprise directory). In accordance with the present invention, the platform of each system 10 includes functionality to support the distributed user context that is useful and used by all important products on each platform via the user objects. The structure for supporting the eUsers includes providing the eDirectory as a non-optional part of the software product suites in use on the computer systems, with the eDirectory being the distributed security repository for all multiplatform products, and having a minimum common schema, standard LDAP interfaces with full support for vital data ACID properties, where LDAP stands for lightweight directory access protocol, an Internet standard for directories. ACID is defined as Atomicity, Consistency, Isolation, and Durability, as is well known in the database art. Every system further includes an eDirectory security adapter, eDSA, that intercepts security account information on each platform and populates it into the eDirectory, including removing an association for an eUser when the user identification and password becomes invalid on a platform. The eUser comprises a security context 'above' the local security context of the system. Enterprise Users and the eDirectory is further described in co-pending U.S. patent application Ser. No. 09/165,368, filed on Oct. 2, 1998. Applicants hereby incorporates this patent application by reference.

Enterprise Group

Figure 4:
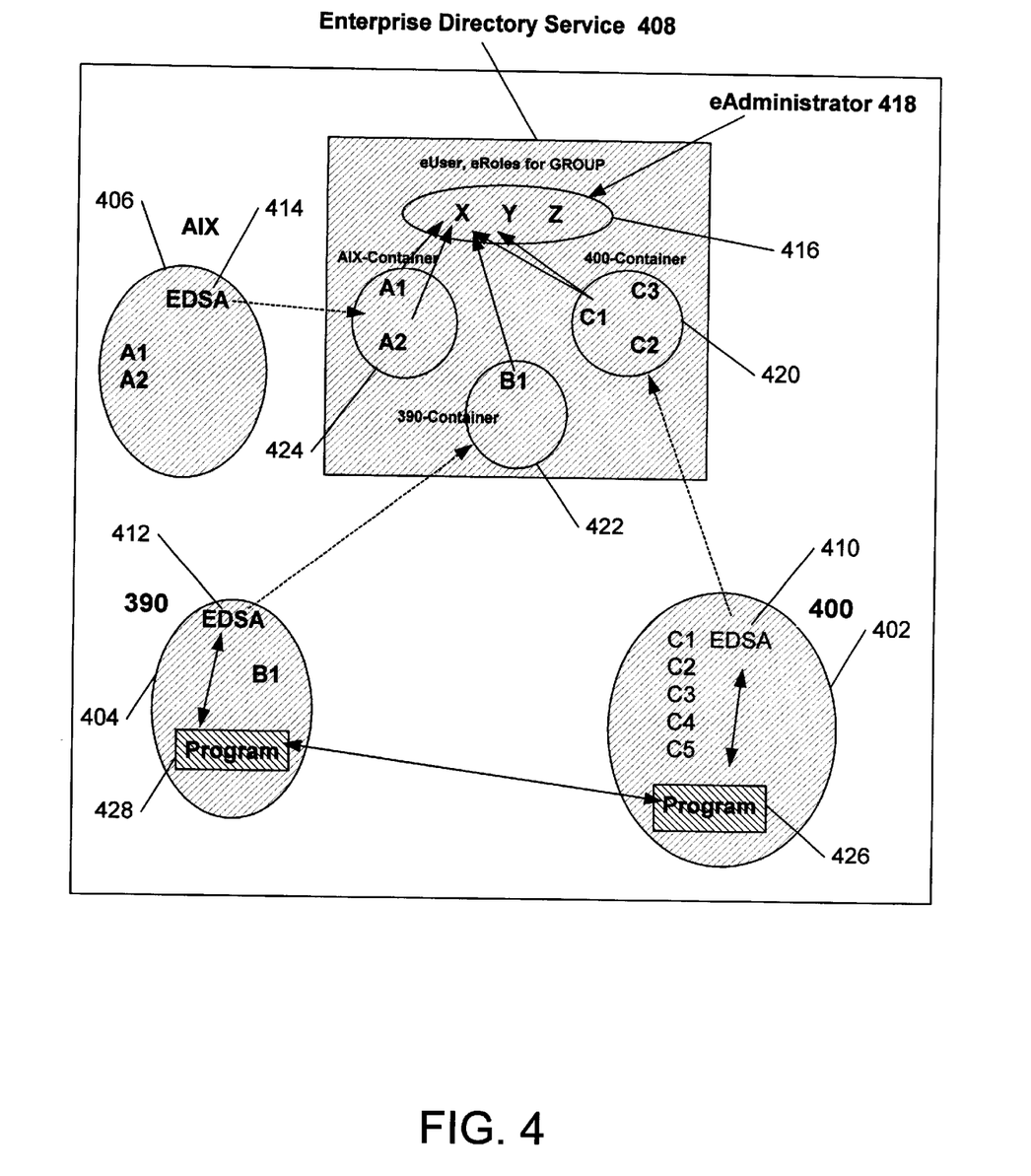
FIG. 4 illustrates a preferred embodiment of a heterogeneous network with the grouping of systems in accordance with the present invention.

FIG. 4 illustrates a preferred embodiment of a heterogeneous network with the grouping of systems in accordance with the present invention. FIG. 4 illustrates the logical layout of a plurality of heterogeneous systems 402, 404, 406 which are grouped together into an Enterprise Group, or eGroup, to share an eDirectory Service 408. The eDirectory Service 408 is accessible to each member of the eGroup. The eDirectory Servers (not shown) can be located on any member of the eGroup that is deemed suitably secure. At least one eDirectory Server must exist in the eGroup which supports the eUsers. For example, system 406 may be operating on an AIX platform; system 404 may be operating on an OS/390 platform; and system 402 may be operating an OS/400 platform. Installed on each system 402, 404, and 406 is an eDSA 410, 412, and 414, respectively. For purposes of this discussion, the group of systems will be referred to as "GROUP". In a container 416 in the eDirectory Service 408 for GROUP, eUsers X and Y are defined via the Enterprise Administrator 418 (eAdministrator). For each system 402, 404, 406, a container is defined to associate operating system (OS) userids on each system with one or more eUsers. For example, containers 420, 422, and 424 are defined in the eDirectory Service 408 for systems 402, 404, and 406, respectively. OS userids A1 and A2 for system 406, B1 on system 404, and C1 on system 402 are associated with eUser X. OS userid C1 may also be associated with eUser Y.

Each eDSA 410, 412, 414 comprises Application Programming Interfaces (API) for creating and deleting objects in the containers 420, 422, 424, mapping between an OS userid and an eUser, and creating encrypted packages for use with the eGroup. The eDSA 410, 412, 414 in accordance with the present invention create opportunities for the OS to inject specific security requirements. For example, the OS decides who is authorized to call the eDSA APIs that create user objects and maps the objects to an eUser. The eDSA 410, 412, 414 also create opportunities for the OS to cache data. For example, an OS may have performance requirements that necessitate that it cache the mapping between C1 and X, so that directory access and network traffic are minimized.

To illustrate how cooperating programs on heterogeneous systems 402, 404, 406 using the eDSA and the eDirectory services to achieve cross platform cooperative programming, assume that Program 426 resides on system 402, Program 428 resides on system 404, and Program 426 is a client of Program 428. First, Program 426 is started on behalf of OS user C1. To perform a task, Program 426 needs to invoke the services of Program 428. Program 426 does not know what kind of platform is used by system 404 or anything about the users on system 404.

To invoke the services of Program 428, Program 426 invokes the eDSA 410 to package an Enterprise Request. The eDSA 410 looks in the eDirectory Service 408 and finds that C1 is associated with eUser X on system 404. The eDSA 410 then packages the request for eUser X. The package returned is cryptographically secure. That is, the package can be sent only to another system in GROUP (all systems in GROUP are within the same Kerberos realm, for example) and is targeted to a specific system within GROUP. Either the entire request may be encrypted, or only a token representing X. The encrypted package is returned to Program 426. Program 426 then forwards the package to Program 428.

Program 428 invokes the eDSA 412 of system 404 to decrypt the package. The eDSA 412 looks in the eDirectory Service 408 and finds that eUserX is associated with userid B1 for system 404. The eDSA 412 returns the results. It may be the entire package decrypted (if it all was encrypted on the way over), or it may be only userid B1 as a special token.

The special B1 token is used by Program 428 in an API call to its operating system. This API is to "impersonate" B1. That is, Program 428 will begin to run under the context of userid B1. Program 428 does the work requested while running under the context of B1. When it is finished, Program 428 will "revert" and no longer impersonate B1.

Program 428 returns the results to Program 426. Optionally, Program 428 could call the eDSA 412 to encrypt the return package similarly to the way Program 426 encrypted the results. This optional step would be so that Program 426 can be assured it is receiving results only from a valid member of the eGroup called GROUP.

In the manner illustrated in FIG. 4, a system in a heterogeneous network may perform cooperative programming with other systems in the same eGroup. Systems with the same eGroup are allowed to define eUsers between them. Enterprise Groups establish boundaries of who can and cannot share eUser definitions. They also establish administrative groups of systems. They establish where trusted directory servers must, can, and cannot reside. They also establish which eDSAs can interact, i.e., scope of impersonation.

A network may establish multiple eGroups. Groups of eGroups may also be established without departing from the spirit and scope of the present invention, where relationships between the eGroups are such that trust can be set up between the eGroups. When two eGroups have a trust relationship, an eUser that is authenticated or set within one eGroup can be trusted and used in another eGroup.

By allowing for the grouping of systems in this manner, access to systems in the network may be more readily controlled. Unnecessary or undesirable access may be minimized.

Internet Personalization

Internet Personalization can be achieved using the same logical layout as illustrated in FIG. 4 except at least one of the systems 402–406 may be a web server and an application server. Instead of defining eUsers, Enterprise Roles (eRoles), are defined in the container 416 of the eDirectory service 408. Enterprise Roles are identities stored in the eDirectory service 408 in a similar manner as eUsers, however, an eRole may be used independently of any specific operating system userid.

Figure 5:
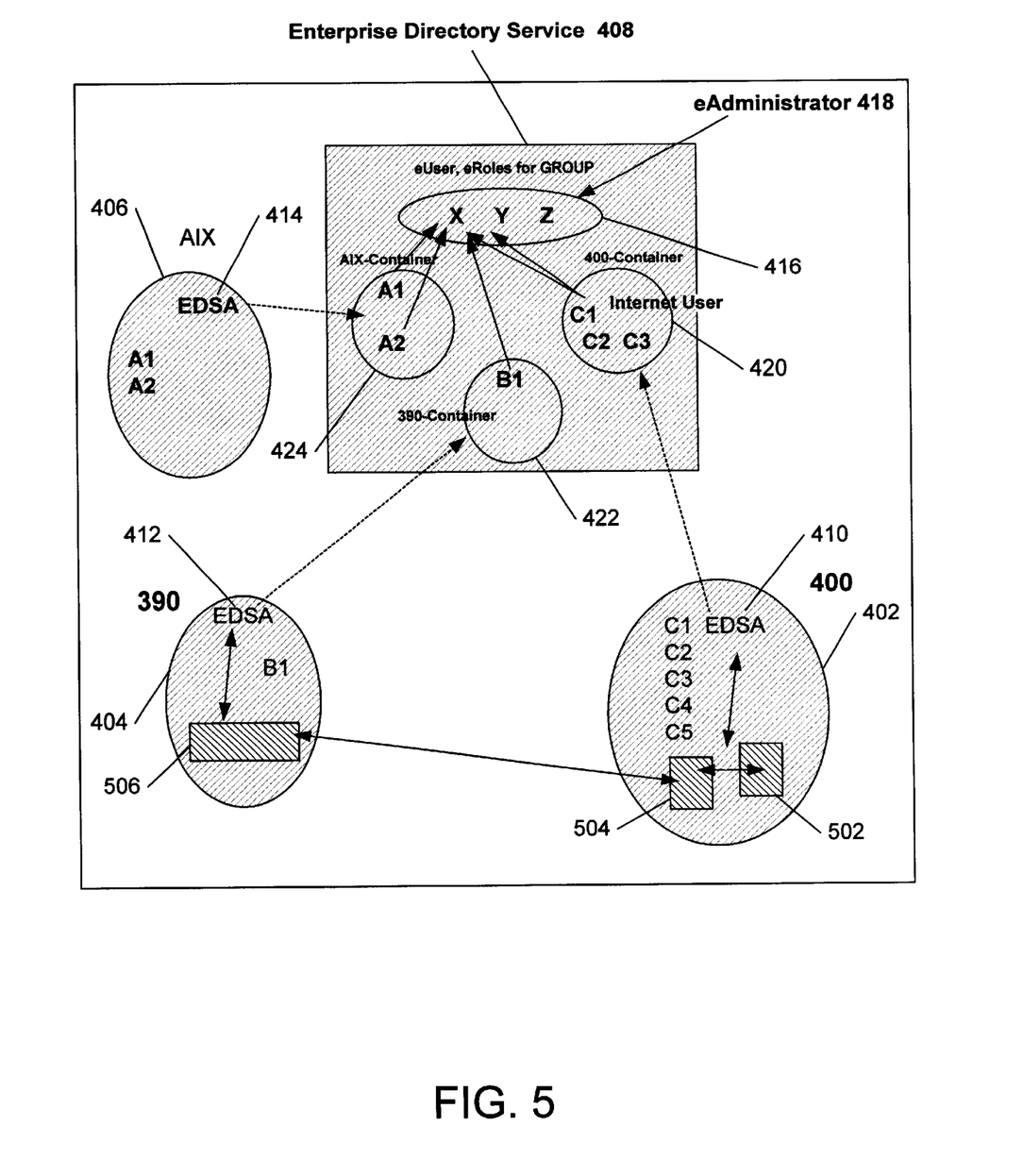
FIG. 5 illustrates a preferred embodiment of a heterogeneous network with Internet personalization in accordance with the present invention.

FIG. 5 illustrates a preferred embodiment of a heterogeneous network with Internet personalization in accordance with the present invention. In this layout, system 402 comprises a web server 502 and a web application server 504. System 404 comprises a Program 506 which may be invoked by the web application server 504, which may be invoked by the web server 502. An eRole, Z, is defined on the eDirectory service 408. An Internet user represented by an customer identifier is associated with eRole Z. First, a request arrives at the web server 502 from a web browser located somewhere in the Internet. The usual steps of securing communication between the web server 302 and the web browser apply, such as using Secure Socket Layer (SSL). The browser determines that the request should be handled by web application server 504. The web application server 504 determines that this request is, for example, a customer using a web store front. This customer has an identity represented by a customer number. The web application server 504 needs other programs, such as Program 506, to do work for it (such as a database, a transaction processing system, a file system, or even the directory service). Since the Internet user is associated with eRole Z, the eDSA 410 packages an Enterprise Request for eRole Z. The request is then processed in the same manner as with eUsers, as described above, except instead of impersonating an eUser, a token for eRole Z is used to make authorization decisions. Programs such as Program 506 are assured of the validity of requests, because all of the encryption services are secure within the eGroup using well known techniques.

For example, assume that eRole Z is named "WebBookBuyingCustomer." The WebBookBuyingCustomer identity can be used by servers to authorize work. For example, the web application server 504 might authorize any requests in the eRole WebBookBuyingCustomer to create a customer account and order books. The web application server 504 might pool database connections pre-authorized to create orders and use any available connection for any request associated with a WebBookBuyingCustomer. The web application server 504 might keep a different database connection associated with WebBookStoreManager, another eRole, and this connection can be used to create new book objects in the online store (and in the database).

In the manner illustrated in FIG. 5, Internet users are provided cross-platform access in a heterogeneous network environment. By allowing eRoles to be defined independently of any specific OS userid, flexibility is injected into the network configuration and Internet user aggravation is reduced.

Although Internet personalization is described above in the context of eGroups, one of ordinary skill in the art will understand that eRoles and Internet personalization may be provided outside the context of eGroups without departing from the spirit and scope of the present invention.

Set up of Enterprise Group and Enterprise Roles

In the preferred embodiment, the following steps may be used to set up an Enterprise Group, and to define Enterprise Roles. The set up process begins with one system, such as system 402 (FIG. 4). An administrator (not shown) on system 402 installs the eDSA 410. The eDSA 410 installs the directory server, if there isn't one already. This administrator, since he is first, becomes the eAdministrator 418. The eAdministrator 418 configures the eDSA 410/ Enterprise Directory Service 408 to hold one eGroup called GROUP.

There is now an eGroup called GROUP consisting of one system 402. The eAdministrator 418 can now create a container 416 in the eDirectory service 408 and define in it eUser objects, such as X and Y. It may also define eRoles, such as Z.

The administrator on system 402 can now use an administrative tool (not shown), such as a Graphical User Interface (GUI), to create new user objects in the container 420 and associate these objects to pre-defined eUser objects.

The eAdministrator 408 allows systems 404 and 406 to join the eGroup called GROUP by creating the container 422 for system 404 and container 424 for system 406, and by creating identities for the eDSAs 412 and 414.

An administrator (not shown) on system 404 installs the eDSA 412 and configures it.

As part of the eDSA 412 configuration, the administrator is asked if he wants to join an eGroup. The administrator responds "yes" and identifies the group by identifying a system on which an eDirectory Server is running. For GROUP, this is system 402 since it is currently the only member of GROUP. The eDSA 412 attempts to connect to the eDirectory Service 408. The eDirectory Service 408 asks the administrator for system 404 for the credentials which were created when container 422 was created. If the administrator for system 404 supplies the credentials correctly, system 404 will join GROUP. The administrator for system 404, using an administrative tool, can now create user objects in container 422 and associate them with eUser objects. The same steps are performed for system 406 to join GROUP.

At any point, the eAdministrator 418 can delegate authority to others to perform eAdministrator duties, such as creating eUser objects in the GROUP container 416. At any point, the eAdministrator 418 can create eRole objects (e.g., eRole Z in FIGS. 4 and 5).

An additional advantage may be gained by requiring eAdministrator actions, such as creating new eUsers, to go through an eDSA layer. That is, the tool used by the eAdministrator 418 may use eDSA API services that only he is authorized to use.

A method and system for providing cross-platform access to an Internet user in a heterogeneous network environment has been disclosed. By allowing eRoles to be defined independently of any specific OS userid, flexibility is injected into the network configuration and Internet user aggravation is reduced. Enterprise Roles may also be provided in the context of eGroups, allowing access to systems in the network by Internet users to be more readily controlled.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for providing cross-platform access to Internet users of a heterogeneous grouping of computers, comprising:

a plurality of heterogeneous computer systems, comprising a first computer system with a first operating system and a second computer system with a second operating system, the first computer system including a first Internet user identity specific to the first operating system, the second computer system including a second Internet user identity specific to the second operating system; and an enterprise directory service, the enterprise directory service being shared by the plurality of computer systems, the enterprise directory including at least one enterprise role defined independently of any specific operating system, the at least one enterprise role being associated with the first and second Internet user identities, wherein the first Internet user identity can he mapped to the at least one enterprise role and the at least one enterprise role can he mapped to the second Internet user identity, such that the first computer system can access the second computer system with authorities of the second Internet user identity.

2. The system of claim 1, wherein the first computer systems comprises a first enterprise directory service adapter (eDSA), and the second computer system comprises a second eDSA.

3. The system of claim 2, wherein the first eDSA comprises at least one of a first plurality of Application Programming Interfaces (API) for creating and deleting the first Internet user identity in a container in the enterprise directory service, and mapping between the fiat Internet user identity and the at least one enterprise role, wherein the second ePDA comprises at least one of a second plurality of API for creating and deleting thee second Internet user identity in the container and mapping between the second Internet user identity and the at least one enterprise role.

4. The system of claim 1, wherein the enterprise directory service further comprises a container, the container comprising the at least one enterprise role.

5. The system of claim 1, wherein the enterprise directory service further comprises an enterprise administrator, the enterprise administrator capable of performing at least one of the following functions:

defining one or more enterprise roles;

creating a container, the container comprising the enterprise roles; and creating an identity for an eDSA for each of the plurality of computer systems.

6. A method for providing cross-platform access to Internet users of a heterogeneous grouping of computers, the menthod comprising:

(a) administering a first of a plurality of computer systems operating under a first operating system platform through a first eDSA, the first computer system including a first Internet user identity specific to the first operating system platform;

(b) administering a second of a plurality of computer systems operating under a second operating system platform through a second eDSA, the second computer system including a second Internet user identity specific to the second operating system platform; and (c) configuring an enterprise directory service to be shared by the first and the second computer systems, the enterprise directory service including at least one enterprise role defined independently of any specific operating system, the at least one enterprise role being associated with the first and second Internet user identities;

(d) invoking a request by the first Internet user identity to he serviced on the second computer system;

(e) mapping the first Internet user identity to the at least one enterprise role by the first eDSA;

(f) mapping the at least one enterprise role to the second Internet user identity by the second eDSA; and (g) servicing the request by the second computer system, the servicing being authorized based upon the second Internet user identity.

7. The method of claim 6, wherein the configuring step (c) comprises:

(c1) creating a container in the enterprise directory service, the container comprising the at least one enterprise role; and (c2) creating an enterprise administrator.

8. The method of claim 7, wherein the enterprise administrator is capable of performing at least one of the following functions:

defining one or more enterprise roles;

creating a container, the container comprising the one or more enterprise roles; and creating identities for the first and the second eDSAs.

9. The method of claim 6, wherein the invoking step (d) comprises:

(d1) invoking the request by the first Internet user identity on the first computer system to be serviced on the second computer system;

(d2) determining by the first eDSA that the first Internet user identity is associated with the at least one enterprise role;

(d3) packaging the request by the first eDSA as being invoked by the at least one enterprise role; and (d4) forwarding the packaged request to the second computer system.

10. A computer readable medium with program instructions for enabling cross-platform access to Internet users of a heterogeneous grouping of computers, comprising the instructions for:

(a) administering a first of a plurality of computer systems operating under a first operating system platform through a first eDSA, the first computer system including a first Internet user identity specific to the first operating system platform;

(b) administering a second of a plurality of computer systems operating under a second operating system platform through a second eDSA, the second computer system including a second Internet user identity specific to the second operating system platform; and (c) configuring an enterprise directory service to be shared by the first and the second computer systems, the enterprise directory service including at least one enterprise role defined independently of by a specific operating system, the at least one enterprise role being associated with the first and second Internet user identifies;

(d) invoking a request by the first Internet user identity to be serviced on the second computer system;

(e) mapping the first Internet user identity to the at least one enterprise role by the first eDSA;

(f) mapping the at left one enterprise role to the second Internet user identity by the second eDSA;

(g) servicing the request by the second computer system the servicing being authorized based upon the second Internet user identity.

11. The medium of claim 10, wherein the configuring instruction (c) comprises instructions for:

(c1) creating a container in the enterprise directory service, the container comprising the at least one enterprise role; and (c2) creating an enterprise administrator.

12. The medium of claim 11, wherein the enterprise administrator is capable of performing at least one of the following functions:

defining one or more enterprise roles;

creating a container, the container comprising the one or more enterprise roles; and creating identities for the first and the second eDSAs.

13. The medium of claim 10, wherein the invoking instruction (d) comprises instructions for:

(d1) invoking the request by the first Internet user identity on the first computer system to be serviced on the second computer system;

(d2) determining by the first eDSA that the first Internet user identity is associated with the at least one enterprise role;

(d3) packaging the request by the first eDSA as being invoked by the at least one enterprise role; and (d4) forwarding the packaged request to the second computer system.

14. A method for enabling cross-platform access to Internet users of a heterogeneous grouping of computers, the method comprising:

(a) invoking a request by a first Internet user identity Specific to a first operating system on a first of a plurality of computer systems to be serviced on a second of the plurality of computer systems;

(b) determining by a first eDSA on the first computer system that the first Internet user identity is associated with an enterprise role, the enterprise role being defined independently of any specific operating system in an enterprise directory service shared by the first and the second computer systems;

(c) packaging the request by the first eDSA as being invoked by the enterprise role;

(d) forwarding the packaged request to the second computer system;

(e) determining by a second eDSA on the second computer system that the enterprise role is associated with a second Internet user identity specific to a second operating system on the second computer system; and (f) servicing the packaged request by the second computer system, the servicing being authorized based upon the second Internet user identity.

15. A computer readable medium with program instructions for enabling cross-platform access to Internet users of a heterogeneous grouping of computers, comprising the instructions for:

(a) invoking a request by a first Internet user identity specific to a first operating system on a first of a plurality of computer systems to be serviced on a second of the plurality of computer systems;

(b) determining by a first eDSA on the first computer system that the first Internet user identity is associated with an enterprise role, the enterprise role being defined independently of any specific operating system in an enterprise directory service shared by the first and the second computer systems;

(c) packaging the request by the first eDSA as being invoked by the enterprise role;

(d) forwarding the packaged request to the second computer system;

(e) determining by a second eDSA on the second computer system that the enterprise role is associated with second Internet user identity specific to second operating system on the second computer system; and (f) servicing the packaged request by the second computer system, the servicing being authorized based upon the second Internet user identity.

* * * * *

UNITED STATES PATENT AND TRADEMARK OFFICE
CERTIFICATE OF CORRECTION

PATENT NO. : 6,732,172 B1
DATED : May 4, 2004
INVENTOR(S) : Daniel E. House et al.

It is certified that error appears in the above-identified patent and that said Letters Patent is hereby corrected as shown below:

Column 6,
Line 55, -- As part of the eDSA 412 configuration,.... -- should follow after the word "it".

Column 7,
Line 64, remove "fiat" and replace with -- first --.
Line 66, move "ePDA" and replace with -- eDSA --.
Line 67, remove "thee" and replace with -- the --.

Column 8,
Line 29, delete "and".

Column 9,
Line 23, delete "by a" and replace with -- any --.
Line 34, delete "system" and replace with -- system, --.

Column 10,
Line 10, remove "Specific" and replace with -- specific --.
Line 51, after "with" add -- a --.

Signed and Sealed this

Third Day of August, 2004

JON W. DUDAS
*Acting Director of the United States Patent and Trademark Office*